Patented July 24, 1934

1,967,287

UNITED STATES PATENT OFFICE 1,967,287

ANHYDROUS CHLORETONE AND PROCESS OF MAKING SAME

Marion Scott Carpenter, Nutley, N. J., assignor to Givaudan-Delawanna, Inc., New York, N. Y., a corporation of New York No Drawing. Application April 1, 1932, Serial No. 602,632

9 Claims. (Cl. 260—156)

This invention relates to anhydrous chloretone and a process of preparing same.

Chloretone may be prepared by the condensation of acetone and chloroform in the presence of caustic alkalies, diacetone alcohol also being formed. Upon the addition of water, hydrated chloretone is crystallized out. The water of crystallization is very objectionable because when the product is dissolved in oil, naphtha, or other solvents, part of the water of crystallization is split off, making the solution cloudy, or even forming a layer of water. The removal of this water by known methods is very difficult, and the presence of such will rust the container, discolor the product, and render it unsightly.

Hydrated chloretone sublimes very readily and various attempts to obtain the anhydrous form have been unsuccessful.

I have now found that anhydrous chloretone can be easily prepared and with practically quantitative results, by subjecting melted hydrated chloretone to the action of a dehydrating agent which will retain water at temperatures up to or above 100° C., or below the decomposition point of chloretone, such as calcium oxide, calcium chloride, magnesium chloride, etc. Preferably, the dehydrating agent should be anhydrous, but good results may be obtained with dehydrating agents containing some water. I have also found that the above dehydrating agents have a bleaching action on the chloretone so that the resulting product becomes considerably whiter in color.

According to this invention, hydrated chloretone melting at about 80° C. is heated up to about 100° C., and the dehydrating agent is added while stirring. If desired, a reflux condenser may be used to reflux any fumes formed. The mixture is stirred for about one half hour, permitted to settle, while keeping above 96° C. and the clear anhydrous melted chloretone is removed. The anhydrous product may be placed in suitable containers with or without filtering.

Example I 100 pounds of molten hydrated chloretone is heated up to about 100° C. in a steam jacketed kettle, 10 pounds of calcium oxide is added and the mixture is stirred for one half hour. The mixture is allowed to settle while maintained molten, and the clear anhydrous chloretone removed by decantation. The anhydrous chloretone has a melting point of around 96° C.

Example II 100 pounds of molten hydrated chloretone is heated up to about 100° C. in a steam jacketed kettle, 12 pounds of anhydrous calcium chloride is added, and the mixture stirred for about one half hour. The molten mixture is filtered and the anhydrous chloretone filtrate has a melting point of around 96¼° C.

Anhydrous chloretone crystallizes as monoclinic crystals, the crystals having substantially greater length than width, melts at 96–97° C., and is freely soluble in oil and other solvents without causing a cloudy solution, or formation of a water layer.

I claim as my invention:

1. A process of preparing anhydrous chloretone comprising subjecting molten hydrated chloretone to the action of calcium oxide.

2. A process of preparing anhydrous chloretone comprising subjecting molten hydrated chloretone to the action of calcium oxide at up to about 100° C.

3. A process of preparing anhydrous chloretone comprising subjecting molten hydrated chloretone to the action of calcium chloride.

4. A process of preparing anhydrous chloretone comprising subjecting molten hydrated chloretone to the action of calcium chloride at up to about 100° C.

5. A process of preparing anhydrous chloretone comprising subjecting molten hydrated chloretone to the action of magnesium chloride.

6. A process of preparing anhydrous chloretone comprising subjecting molten hydrated chloretone to the action of magnesium chloride at up to about 100° C.

7. A process of preparing anhydrous chloretone comprising heating hydrated chloretone at up to about 100° C., adding a dehydrating agent selected from the group consisting of calcium oxide, calcium chloride and magnesium chloride which retains water at up to about 100° C. while stirring, and removing the molten anhydrous chloretone.

8. Monoclinic crystalline, anhydrous chloretone, the crystals having substantially greater length than width.

9. A process of preparing anhydrous chloretone comprising subjecting molten hydrated chloretone to the action of a dehydrating agent selected from the group consisting of calcium oxide, calcium chloride and magnesium chloride.

MARION SCOTT CARPENTER.